United States Patent
Yost et al.

(10) Patent No.: US 9,937,448 B2
(45) Date of Patent: Apr. 10, 2018

(54) FORMING FILTRATION MEDIA FOR MAINTAINING FLOW PASSAGE THROUGH A SOCK STYLE FILTER

(71) Applicant: Kuss Filtration Inc., Findlay, OH (US)

(72) Inventors: Michael E. Yost, Tiffin, OH (US);
Tracie L. Stutzman, Findlay, OH (US);
Gary L. Rickle, Wharton, OH (US);
William Nichelson, Bellefontaine, OH (US)

(73) Assignee: Kuss Filtration Inc., Findlay, OH (US)

( * ) Notice: Subject to any disclaimer, the term of this patent is extended or adjusted under 35 U.S.C. 154(b) by 242 days.

(21) Appl. No.: 14/720,322

(22) Filed: May 22, 2015

(65) Prior Publication Data

US 2016/0339363 A1    Nov. 24, 2016

Related U.S. Application Data

(60) Provisional application No. 62/001,922, filed on May 22, 2014.

(51) Int. Cl.

| | | |
|---|---|---|
| B01D 29/11 | (2006.01) | |
| B01D 35/027 | (2006.01) | |
| B29C 51/08 | (2006.01) | |
| B29C 51/14 | (2006.01) | |
| B29C 59/02 | (2006.01) | |
| B29L 31/14 | (2006.01) | |

(52) U.S. Cl.
CPC .......... *B01D 29/111* (2013.01); *B01D 29/114* (2013.01); *B01D 35/027* (2013.01);
(Continued)

(58) Field of Classification Search
CPC ... B01D 29/111; B01D 29/114; B01D 35/027; B01D 35/0273; B29C 51/082; B29C 51/14; B29C 59/026; B29L 2031/14
(Continued)

(56) References Cited

U.S. PATENT DOCUMENTS

| | | |
|---|---|---|
| 4,304,664 A | 12/1981 | McAlindon et al. |
| 5,902,480 A | 5/1999 | Chilton |

(Continued)

FOREIGN PATENT DOCUMENTS

| | | |
|---|---|---|
| CN | 1 891 805 A | 1/2007 |
| EP | 0 787 519 A2 | 8/1997 |

(Continued)

OTHER PUBLICATIONS

International Search Report for PCT/US2015/32244, dated Aug. 7, 2015.

(Continued)

*Primary Examiner* — Madeline Gonzalez
(74) *Attorney, Agent, or Firm* — Brinks Gilson & Lione

(57) ABSTRACT

A sock style filter is disclosed that incorporates the embossing of filtration media to create rigid raised geometry embodiments that prevent collapse between the upper and lower filtration media sides of the filter to maintain and ensure a flow passage of fluid inside the filter for flow to the pump or downstream system. The embossed rigid embodiments keep the filtration media from collapsing under suction and eliminates the use of secondary inserted structures; such as a plastic comb or folded net, or injection mold plastic ribs or bones onto or around the filtration media.

21 Claims, 15 Drawing Sheets

(52) U.S. Cl.
CPC ........ *B01D 35/0273* (2013.01); *B29C 51/082* (2013.01); *B29C 51/14* (2013.01); *B29C 59/026* (2013.01); *B29L 2031/14* (2013.01)

(58) Field of Classification Search
USPC .................. 210/490, 455, 499, 498, 416.1, 210/172.2–172.4, 171
See application file for complete search history.

(56) References Cited

U.S. PATENT DOCUMENTS

| | | | |
|---|---|---|---|
| 6,273,938 | B1 | 8/2001 | Fanselow et al. |
| 7,625,418 | B1 | 12/2009 | Choi |
| 2003/0010692 | A1 | 1/2003 | Sato et al. |
| 2003/0080046 | A1 | 5/2003 | Ito |
| 2005/0061723 | A1* | 3/2005 | Matsushita .......... B01D 29/072 210/171 |
| 2013/0008849 | A1 | 1/2013 | Gehwolf et al. |

FOREIGN PATENT DOCUMENTS

| | | | |
|---|---|---|---|
| GB | | 586428 A | 3/1947 |
| WO | WO 2004/091755 A1 | | 10/2004 |

OTHER PUBLICATIONS

Supplementary European Search Report for EP 15 795 779.6, dated Jan. 8, 2018, 4 pgs.

\* cited by examiner

FORMING FILTRATION MEDIA FOR MAINTAINING FLOW PASSAGE THROUGH A SOCK STYLE FILTER

CROSS-REFERENCE TO RELATED APPLICATIONS

This application claims the benefit of U.S. Provisional Patent Application Ser. No. 62/001,922 filed on May 22, 2014, entitled "FORMING FILTRATION MEDIA FOR MAINTAINING FLOW PASSAGE THROUGH A SOCK STYLE FILTER," the entire contents of which are incorporated herein by reference.

TECHNICAL FIELD

The present disclosure relates to a filter, such as a filter used inside a liquid tank, and more particularly relates to embossing the flexible filtration media of the filter to create rigid formations that prevent the filter arrangement from collapsing under suction, thereby effectively ensuring a flow passage of liquid leading to the fuel pump or downstream system.

BACKGROUND

A conventional sock style in-tank fuel filter is comprised of filtration media and a connector that attaches the filter to a fuel pump, tube or pipe for suctioning fluid through the filter. The filtration media is typically comprised of flexible, non-rigid, draping cloth. The filtration media is formed into a sock structure and used for filtering or removing contamination from a fuel or other liquid. The liquid that flows through a sock style filter is most often directionally flowing from the outside of the filter to the inside. Attached to a portion of the filtration media is a metal or plastic connector that is used to attach the filter to a fuel pump, tube or pipe or other suction flow apparatus. The outside to inside flow direction through the filtration media to this connector creates suction inside the filter, which in turn causes the filtration media on the two sides of the filter to move towards and/or against each other, whereby one side of filtration media will compress against the filtration media on the opposite side of the filter. If allowed to press against each other, this suction force can close off the liquid flow through the filter.

Conventional designs use a secondary inserted structure; such as a plastic comb, supportive netting, or injection mold plastic ribs or bones, onto or around the filtration media; to keep the two sides of the filter from compressing together and reducing or blocking the fluid flow. The inserted or injection molded component creates a rigid geometric shape structure of the filter. The drawbacks to this supportive structure is the heightened potential for the presence of dust, dirt, or foreign particles created during the insertion process, or deterioration of the inserted component, and the added cost associated with the insertion process in materials, tooling and labor.

Another aspect of the conventional design is the function of the inserted component as the structure that keeps the filter body rigid and positioned in a flat orientation. A rigid filter structure is also needed to maintain the positioning of the filter inside a fuel tank in the area where the fuel is present. For example, a non-flexible draping cloth without a rigid body structure may fold or bend upwards and become positioned in the air space above the fuel fluid level. Exposure to air may allow air to be drawn into the filter and pass to the system causing flow cavitation and reduced fluid volume.

SUMMARY

In one embodiment of the present disclosure a sock style filter includes filtration media that maintains its position and keeps from collapsing under suction without the additional insertion of a plastic comb, netting, ribs or bones. The filtration media is embossed to create a rigid raised geometry on a surface of the filtration media that is oriented to keep the two sides of the filter separated, thereby effectively ensuring a flow passage of liquid leading to the fuel pump or downstream system. The filter thus generally comprises the filtration media without internal combs or ribs, and a plastic connector attached to the filtration media for connection to a pump.

Embossing, as used herein, is a process to mold a raised geometric design into a layer of material. The embossing of the filtration media can be performed inside the injection mold during molding of the plastic connector attached to the filter. The embossing can also be performed outside the injection mold with a die or other means of compression or permanent deformation. The embodiments of the present disclosure according to the foregoing provide a filter that is simpler to manufacture and has few internal components that can wear or deteriorate over time causing contamination inside the filter. This eliminates potential sources of creating internal contamination that may move with the fluid flow downstream and damage the system the filter is intended to protect from such damage. Eliminating the need to insert a plastic comb or netting inside the filter or injection mold a set(s) of ribs or bones onto or around the filtration media also reduces the complexity and cost of the injection mold and process tooling.

One implementation of the filter creates long embossed areas or strips on one or both sides of the filtration media that function as rigid formation to maintain an open pocket inside the filter. In another implementation, the invention creates multiple patches or localized areas of emboss on one or both sides of the filtration media that function as rigid formations to maintain a rigid body structure and an open pocket inside the filter.

DETAILED DESCRIPTION

Figure 1:
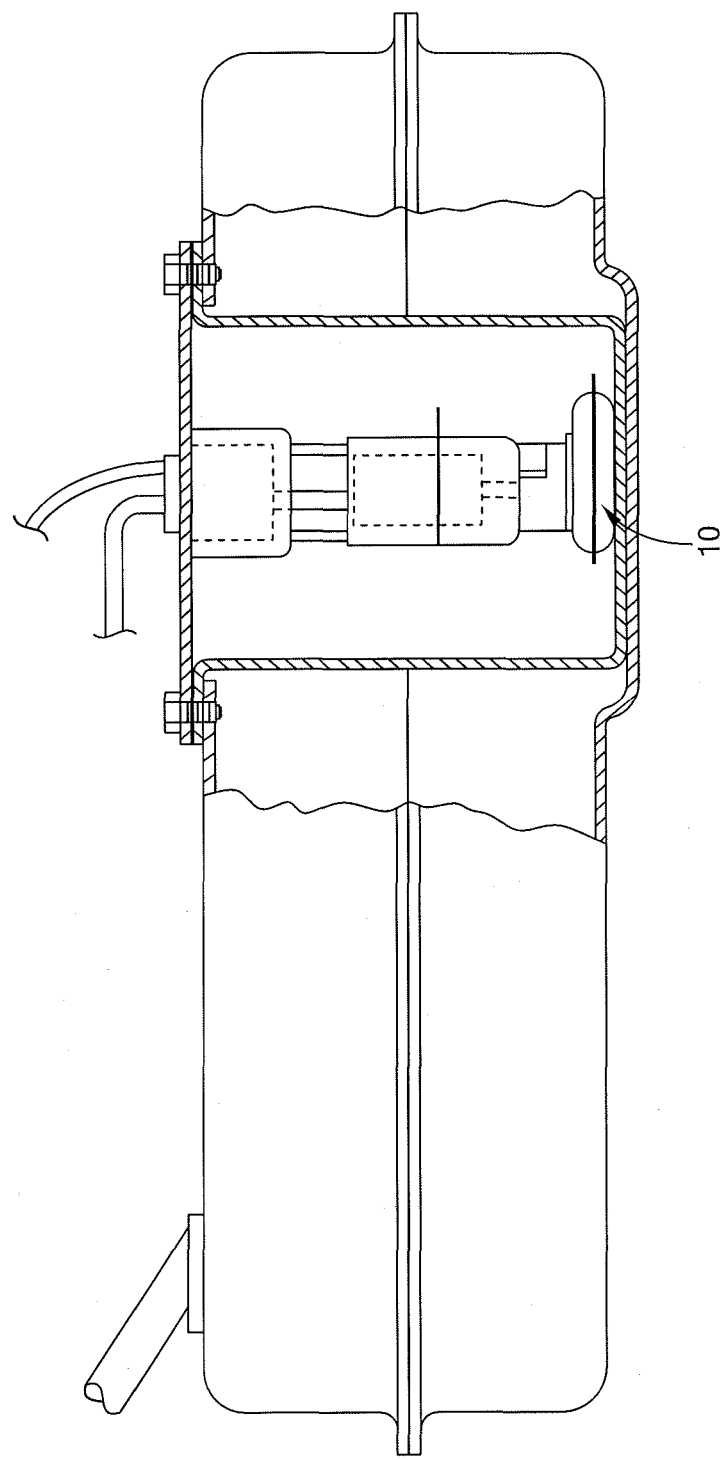
FIG. 1 is a diagrammatic, side elevation view of a motor vehicle fuel tank having a pump module that can incorporate the filtration media described herein.

The present disclosure includes many embodiments of filtration media that are embossed, as described further herein, and preferably utilized in filters defining an enclosed interior space such as sock style filters used for a number of fluids including, but not limited to, fuel such as unleaded fuel or diesel fuel, hydraulic fluid, lubrication oil, urea, and other fluids (both liquid and gaseous). For convenience, the filter structure will be described herein as being for use in fuel filtration. To help describe the concepts of the filtration media, FIG. 1 illustrates an in-tank housed fuel module of a motor vehicle in which the filtration media described herein can be used. The filtration media can be incorporated into the suction filter 10 located at the bottom of the fuel module. The construction and operation of in-tank housed fuel modules is well known in the art. Other uses of the disclosed filtration media are possible and include various fuel filters disposed both inside and outside a fuel tank and other fluid filters as parts of machines having a suction system such as a pump or vacuum.

Figure 2:
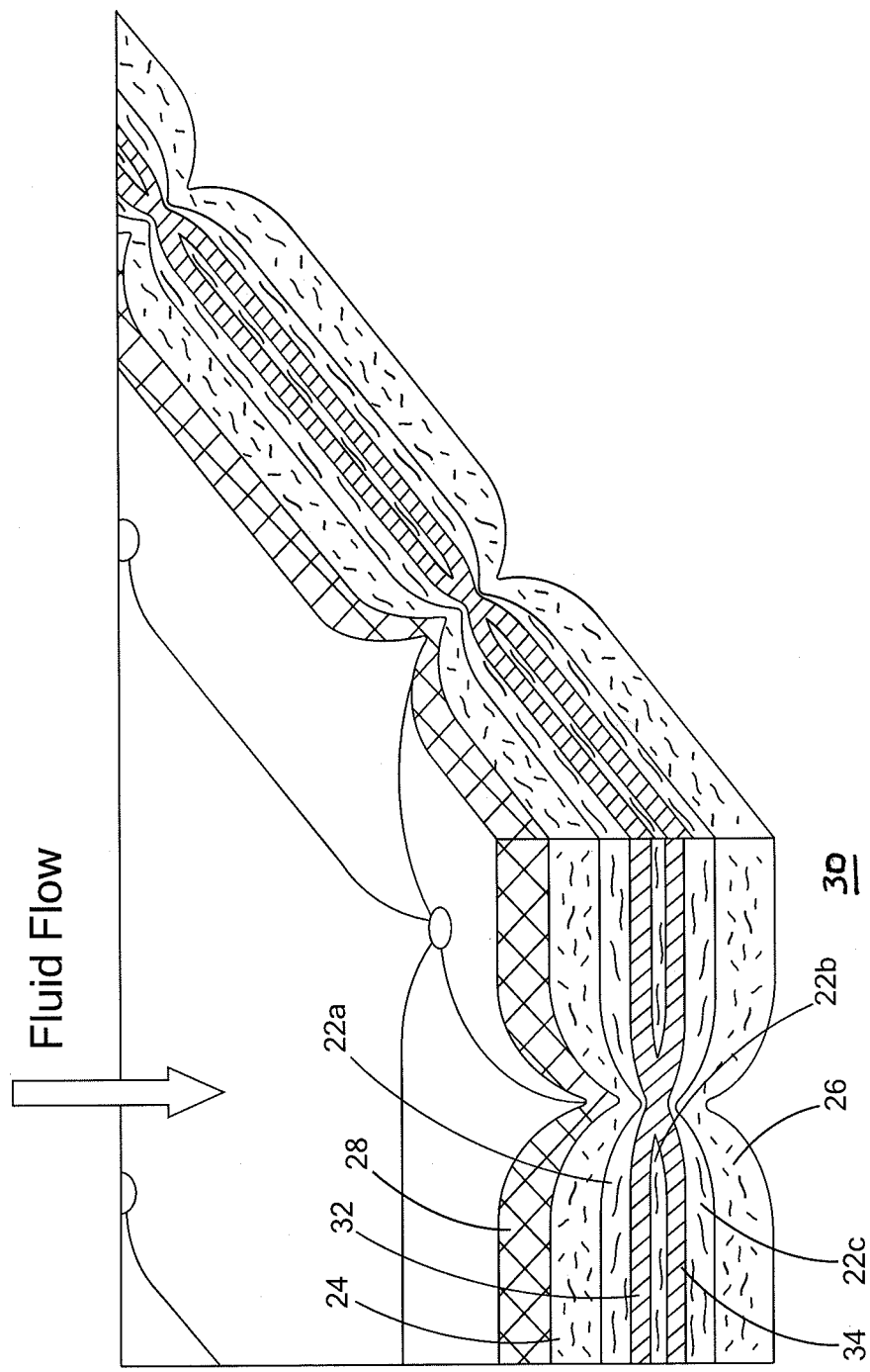
FIG. 2 is an enlarged, fragmentary sectional view of an implementation of filtration media used for embossing in accordance with the disclosure.

Referring to FIG. 2, one implementation of a filtration media 20 that can be embossed in accordance with the teachings of the present disclosure is illustrated. The filtration media 20 may include multiple layers of filter media suitable for filtering fuel such as a gradient depth filter media 22 comprising a plurality of non-woven layers 22a, 22b, 22c, preferably of melt blown filaments. Examples of gradient density melt blown filtration media layers are known in the art, suitable examples of which are disclosed in the following references: U.S. Patent Application Publication No. 2006/0266701, U.S. Pat. No. 6,613,227, and U.S. Pat. No. 7,927,400, each of which are incorporated herein by reference in their entirety.

The filtration media 20 may also include two carrier layers 24 and 26 of non-woven filtration media, e.g. spun bond layers, which can include static dissipative elements. The filtration media 20 may also include an exterior shell layer 28 opposite the interior space 30 within the filter (also referred to herein as the pocket), and one or more channel depth layers 32, 34 positioned adjacent the depth filter media 22. A preferred channel depth filtration media is disclosed in U.S. Publication No. 2014/0202951, the content of which is hereby incorporated by reference in its entirety.

It has been discovered that, through proper construction of the exterior shell layer 28 and/or the channel depth layers 32, 34, i.e. as an embossing layer, the filtration media 20 may be subject to an embossing procedure to provide embossed areas 50 having sufficient size and strength to maintain the interior space 30 between upper and lower portions of the filtration media 22 and prevent collapse and blockage. In one form, the exterior shell layer 28 is constructed of a mesh of plastic or polymer material, and in the case of fuel filters a suitable fuel tolerant and impervious plastic, e.g. nylon, polyester, acetal or Teflon™. The plastic mesh may be an extruded mesh or woven mesh. The exterior layer 28 is formed to have a thickness greater than 500 micron, or greater than 900 micron, or greater than 1200 micron, or greater than 1400 micron. The thickness preferably does not exceed 5000 micron.

The optional channel depth layers 32, 34 may also be constructed from a plastic mesh to provide addition support for embossing. The mesh may be extruded or woven, and formed to have a nominal thickness greater than 250 micron, or greater than 500 micron, or greater than 600 micron, or greater than 900 micron. The thickness preferably does not exceed 2500 micron. Alternatively, the exterior shell layer 28 may be eliminated or formed of alternate materials, while at least one of the channel depth layers 32, 34 (or the combined thickness thereof) is formed with a nominal thickness greater than 500 micron, or greater than 900 micron, or greater than 1200 micron, or greater than 1400 micron. That is, one embossing layer of the filtration media 20 has a thickness, or a combination of multiple embossing layers have a combined thickness, that is greater than 500 micron, or greater than 900 micron, or greater than 1200 micron, or greater than 1400 micron, or greater than 1650 micron. The embossing layer(s) may be the exterior layer 28, placed within the melt blown layers 22a, 22b, 22c (such as one or more channel depth layers 32, 34), or may be placed immediately adjacent one of the carrier layers 24, 26 (including to form a new interior layer directly exposed to the interior space 30), or a combination thereof.

Figure 3:
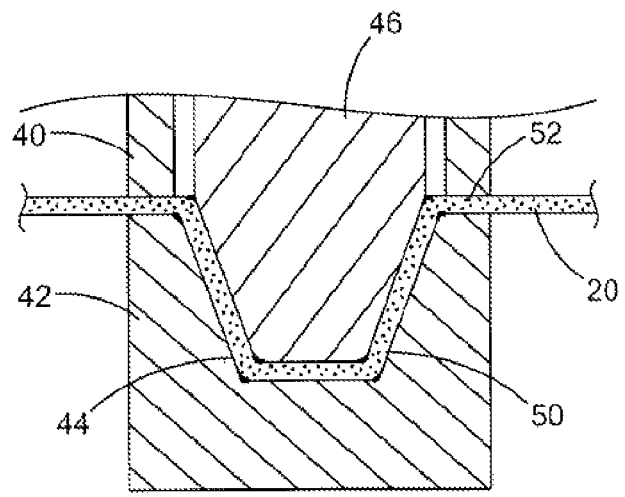
FIG. 3 is a sectional view of a tool for embossing filtration media.

With reference to FIG. 3, embossing of the filtration media 20 is used to provide deep embossed areas 50 that are 2 to 15 mm in height that project or indent into the interior space 30 of the filter. The media 20 has at least one embossing layer of extruded plastic mesh that when compressed will take a permanent emboss and create rigid structures to keep upper and lower portions of the filter separated without a secondary support structure. This structure can be embossed on the top, bottom or both sides of the filtration medias 20. A deep emboss of 2 to 15 mm is used to maintain a flow path for fluid inside the filter.

In one form, an upper die 40 and a lower die 42 are used to clamp the filtration media 20 along the periphery 52 of the embossed area 50, e.g. prior to being formed as a sock or other structure defining the interior space 30. The lower die 42 includes a pocket 44 in the desired cross-sectional shape of the embossed area 50, which also corresponds to the exterior shape of a pin or other tool 46. The tool 46 preferably has a flat crown, i.e. a flat surface at its distal head, with rounded edges so as not to completely crush the layers of filtration media to keep porosity open for fluid flow therethrough. This cross-sectional shape is preferably tapered, e.g. a pyramidal or frusto-conical shape having rounded edges. The tool 46 may optionally be heated to enhance pliability of the plastic embossing layer and assist with the embossing process. The embossed area 50 is stretched by the tool 46 into the desired shape defined by the tool 46 and lower die 42. The periphery 52, and to some extent the embossed area 50, may be compressed or crushed by the dies 40, 42, such that these portions of the media 20 have an overall thickness less than the thickness of the remainder of the media 20, and are sufficiently rigid to maintain the embossed shape under typical suction forces. Factors that may need to be controlled during the embossing process include, but are not limited to, tool/pin design, pressure, speed, heat and die depth.

In other forms, the embossing of the filtration media 20 can be accomplished through the application of variations in combinations of heat, vacuum and pressure to create the rigid structure that is moved out of plane from the remaining portion of the filtration media 20. Embossing is defined herein as a process to mold or carve in relief; stud; to shape, support, or provide with a rib or ribs/or to make the ridges or raised markings. The embossed areas thus provide a permanent, rigid, discontinuity in the surface or planarity of the filtration media, and preferably include corresponding discontinuities in all of the layers of the media 20 from the exterior surface to the interior surface.

Those skilled in the art may alternately identify the method used for embossing as a thermoforming process. Thermoforming is a process term that relates to the process to create projections on the surface of materials with heat, vacuum or pressure. Thermoforming is a manufacturing process where a plastic sheet or flat form is heated to a pliable forming temperature, formed to a specific shape in a mold, and trimmed to create a usable product. The sheet, or "film" when referring to thinner gauges and certain material types, is heated in an oven to a high-enough temperature that it can be stretched or embossed in a mold and cooled to a finished shape. Preferably, the embossing or thermoforming process is accomplish using molding tools that can also mold the pump attachment to the filtration media, and is thus performed immediately before, immediately after, or at the same time as molding the pump attachment. Alternatively, the filtration media can be embossed utilizing a specialized tool and then stored for later use (e.g. by rolling the media into a roll), such as later injection molding of the pump attachment using other tools.

Figure 4:
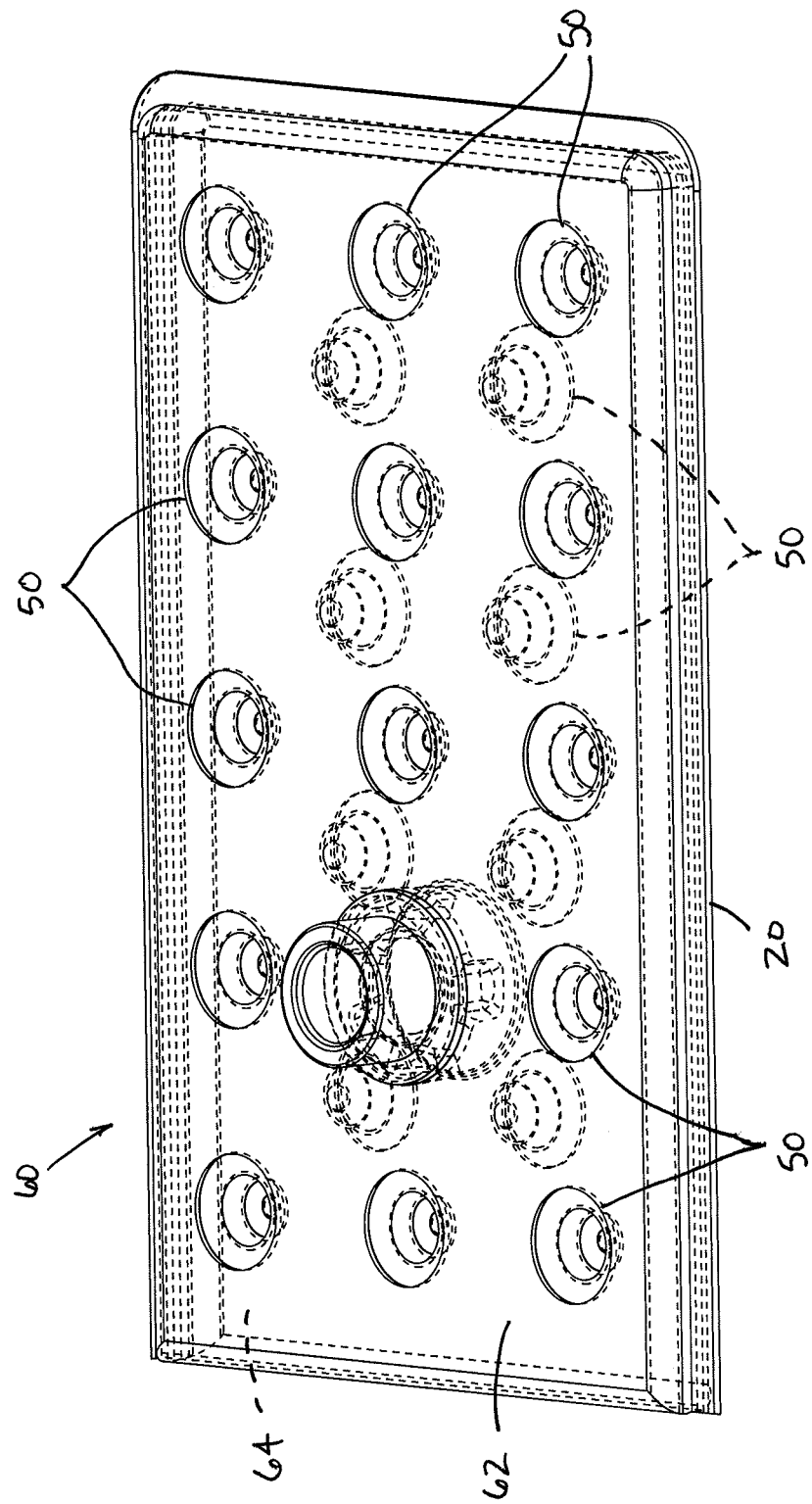
FIG. 4 is a top side detailed pictorial view of an embodiment of a filter with top and bottom areas of dotted embossing formations in the filtration media in accordance with the disclosure.
Figure 5:
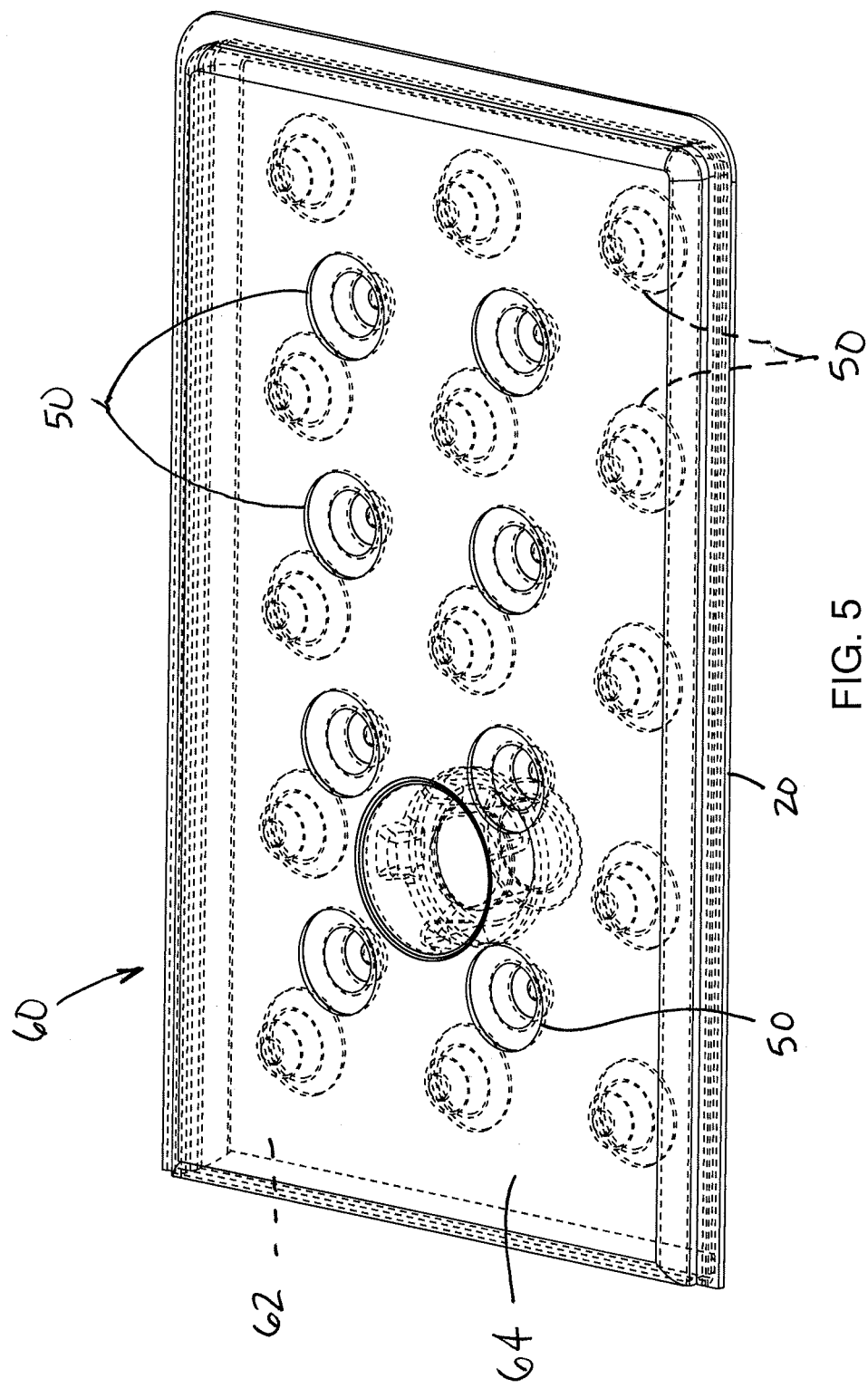
FIG. 5 is a bottom side detailed pictorial view of FIG. 3 in accordance with the disclosure.
Figure 6:
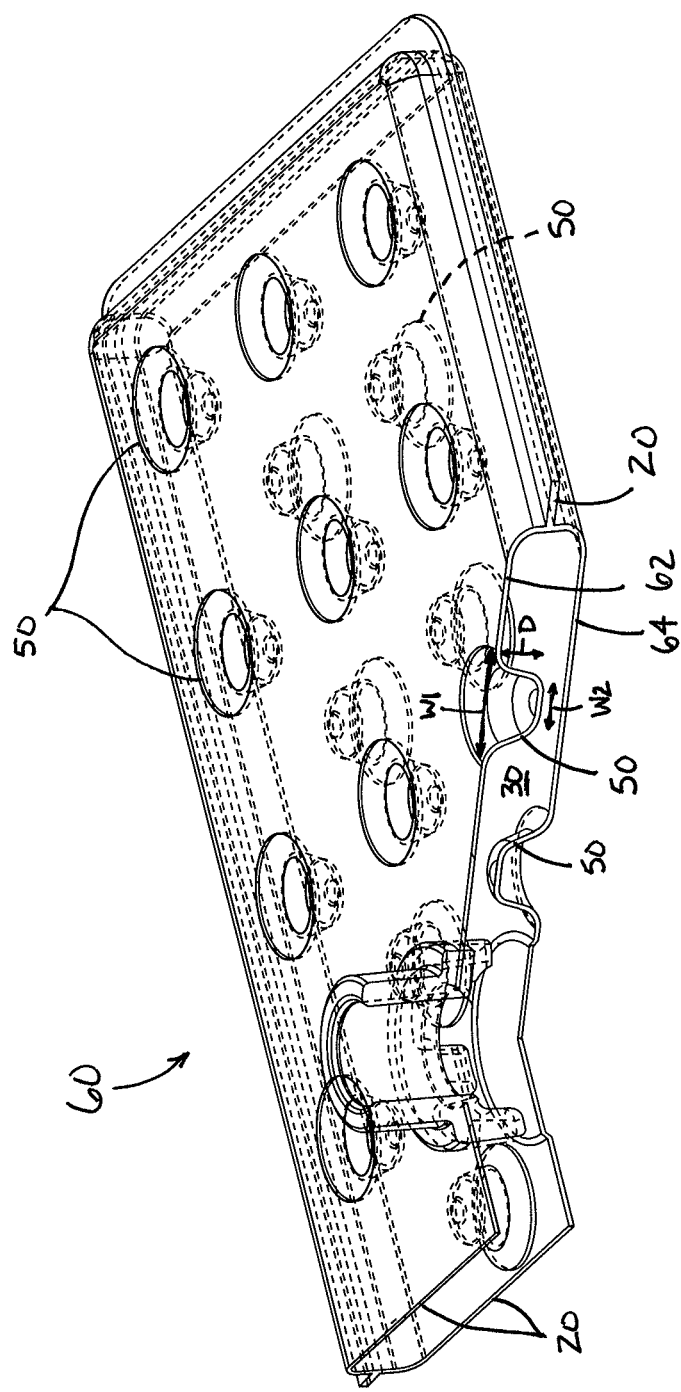
FIG. 6 is a top side cut away view of the filter in FIG. 3 and FIG. 4 in accordance with the disclosure.

In the embodiments of the present disclosure, the embossed filtration media 20 is then formed into a filter, such as filter 60 shown in FIGS. 4-6, having at least a first portion 62 and a second portion 64 (also referred to herein as top/upper and bottom/lower walls or portions based on their typical installation orientation), having an enclosed shape such as a sock style filter, where the media 20 is rolled or folded and the free edges are sealed together using known processes, to form an enclosed interior space. The embossed areas 50 create separation and structure to keep the top and bottom walls 62, 64 of filtration media separated while fluid flows through the in-tank filter 60. The embossing layers of the media 20 has the structural integrity and strength to be compressed with a deep emboss pattern of 2-15 mm, or 4-10 mm, or about 6 mm, that allows for maintaining a pocket (interior space 30) inside the filter for allowing fluid flow. That is, and as best seen in FIG. 6, the upper wall 62 and lower wall 64 each generally extend in an upper and lower plane, and the frusto-conical embossed areas 50 project inwardly from the respective plane towards the interior space 30 (and the opposing wall) a depth D (depth also referred to herein as height). At the respective planes of media 20, the embossed areas 50 have a width W1 that is greater than a width W2 at the peak of the embossed area 50. In this way, the filter does not need to include any internal supportive structure, combs or ribs in the interior space 30.

The embossed areas 50 can have various depths, widths and lengths based on the overall thickness of the media 20, which typically is 0.5-3.5 mm, and usually 1.5-2.5 mm. The emboss depth D is variable but recommended to be distanced from the surface or plane of the filtration media of at least 2 mm and up to 15 mm. This is only a common range of usage and the depth could be more than 15 mm without any measureable affect or benefit on fluid flow, media separation or filter rigidity. The ratio of the embossing depth to media thickness is preferably 100% to 2000%, and more preferably greater than 300%. The area of each upper and lower wall 62, 64 is preferably comprised of 5%-50% embossed areas 50, and more preferably 10%-20% although any percentage of the area may be embossed while still maintaining the interior space 30 and fluid flow. As will be illustrated in selected embodiments, the embossed areas 50 may be different on the top and bottom portions 62, 64 of the filter 60, e.g. either in size (width or depth), shape or relative position to a vertical axis, to allow for the fuel flow through the pocket 30 via the combination of embossed areas 50 on the upper and lower walls 62, 64.

The embossing method of the present disclosure includes the creation of protrusions or bumps having various sizes and shapes, i.e. varying in width and lengths, circular, square, rectangular or oblong shaped dots or pins, each forming an embossed area 50 that is compressed (e.g. reduced thickness of the media 20) and stretched, whereby the filtration media 20 creates permanent deformations. These deformed areas would rest against the filtration media 20 on the opposite side of the filter, e.g. project inside of a sock filter and maintain an open pocket 30 inside the filter for fluid flow and provide rigidity to the filter to provide a filter structure and overall geometric shape.

Referring again to FIGS. 4-6, the embossed areas 50 illustrated are formed as dots or points on both the top and bottom walls 62, 64 of the filter 60 and provide separation between the top and bottom of the filter 60 to keep the interior space 30 open. Stated another way, the embossed areas 50 are each a discontinuity having a frusto-conical shape. This embossing ensures the media 20 does not collapse against the top and bottom portions or sides and reduce or block off the flow of fluid through the filter 60. FIG. 5 shows the bottom side of the same filter 60 with the images of the staggering of the dots with respect to the top and bottom sides of the filter. That is, the embossed dots 50 on the upper portion 62 are not radially aligned relative to a vertical axis (e.g. an axis passing through the inlet fitting) with the embossed dots 50 of the lower portion 64. The embossed dots 50 on each side 62, 64 are preferably spaced apart in an array or grid. FIG. 6 is a cut away of the same filter in FIG. 4 and FIG. 5 and shows how the embossed dots 50 provide a separation space 66 between the top and bottom walls 62, 64 of the filter 60.

Figure 7:
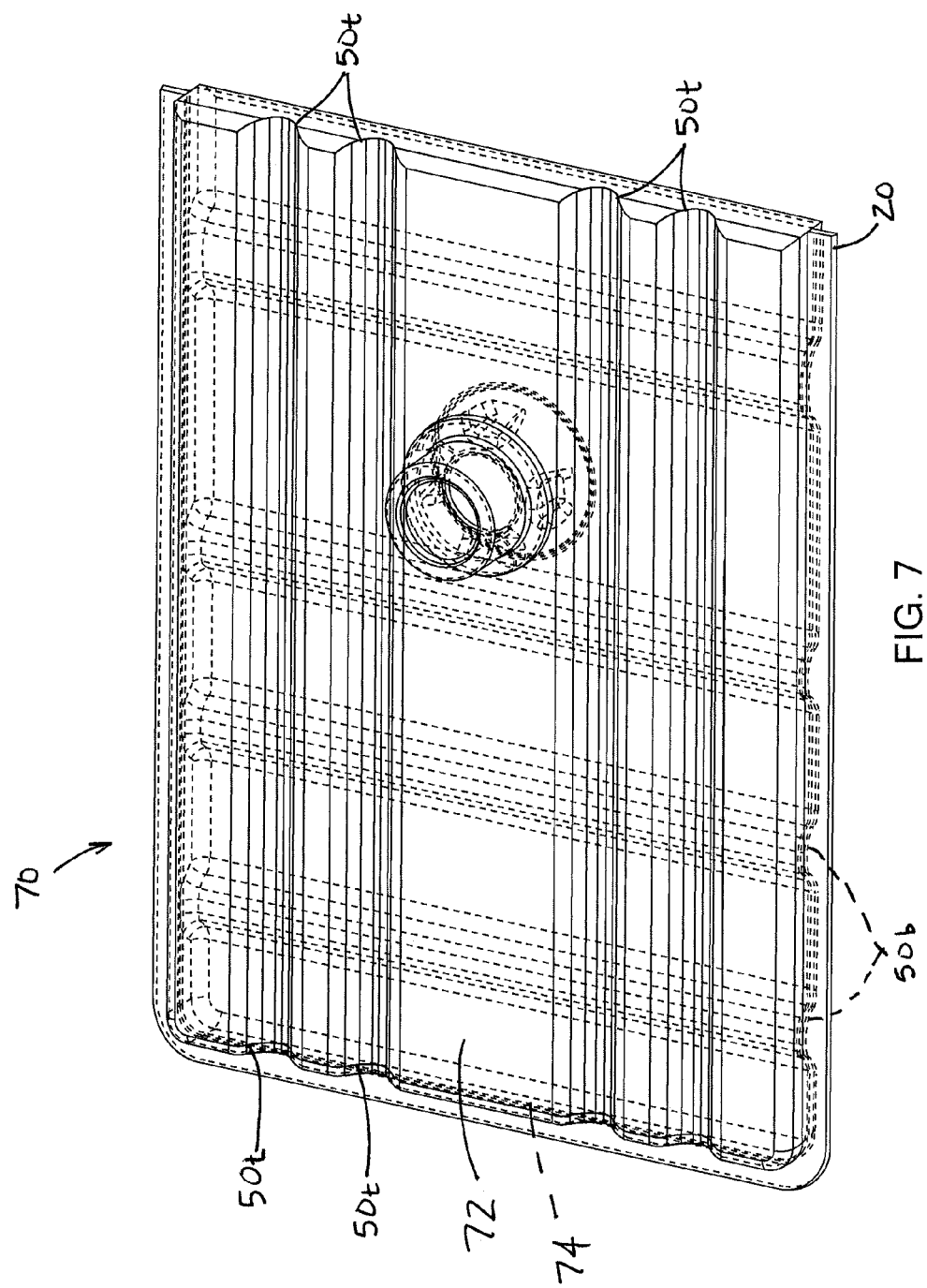
FIG. 7 is a top side detailed pictorial view of an alternate embodiment of a filter with top and bottom areas of long embossing formations in the filtration media in accordance with the disclosure.
Figure 8:
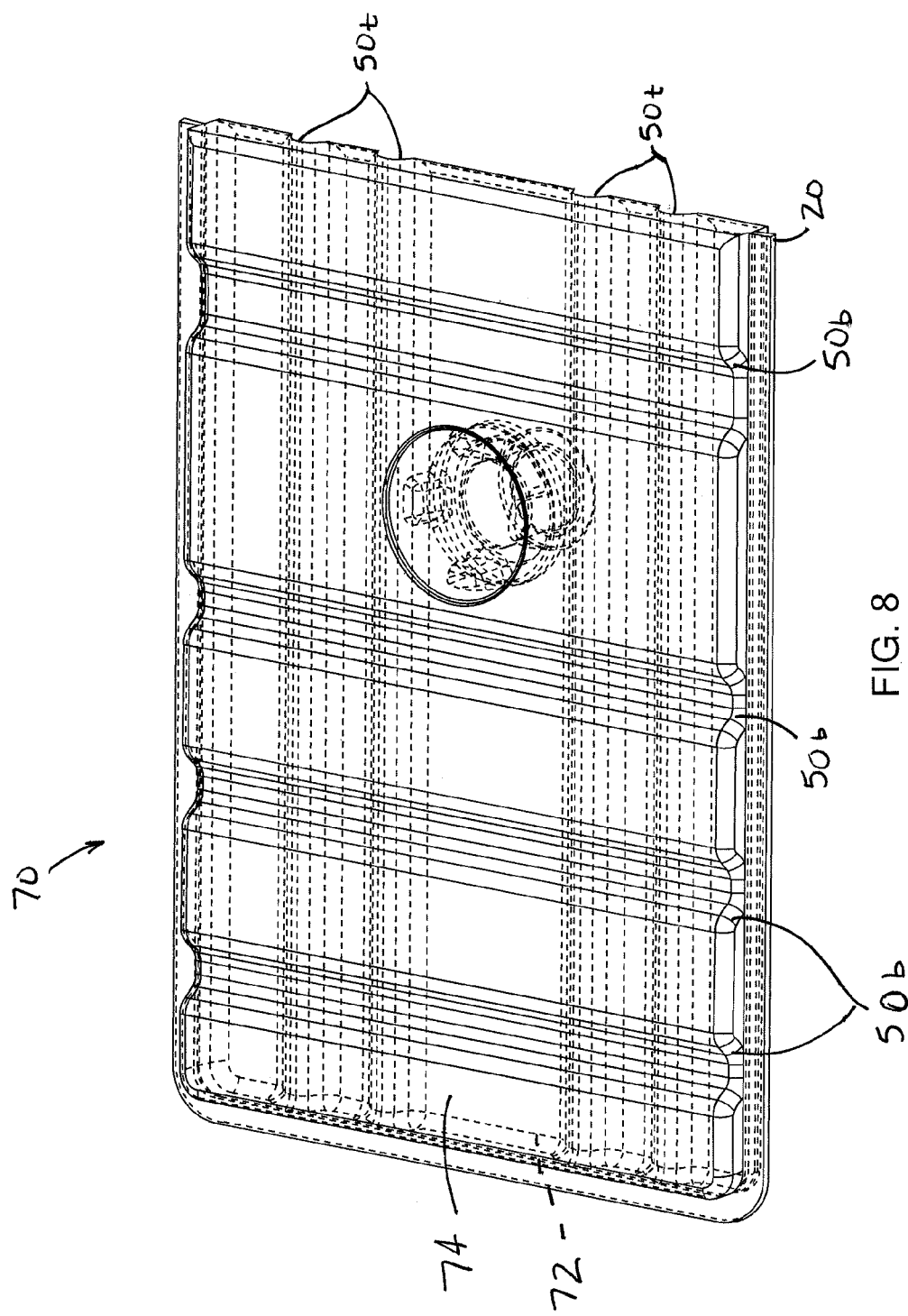
FIG. 8 is a bottom side detailed pictorial view of FIG. 6 in accordance with the disclosure.
Figure 9:
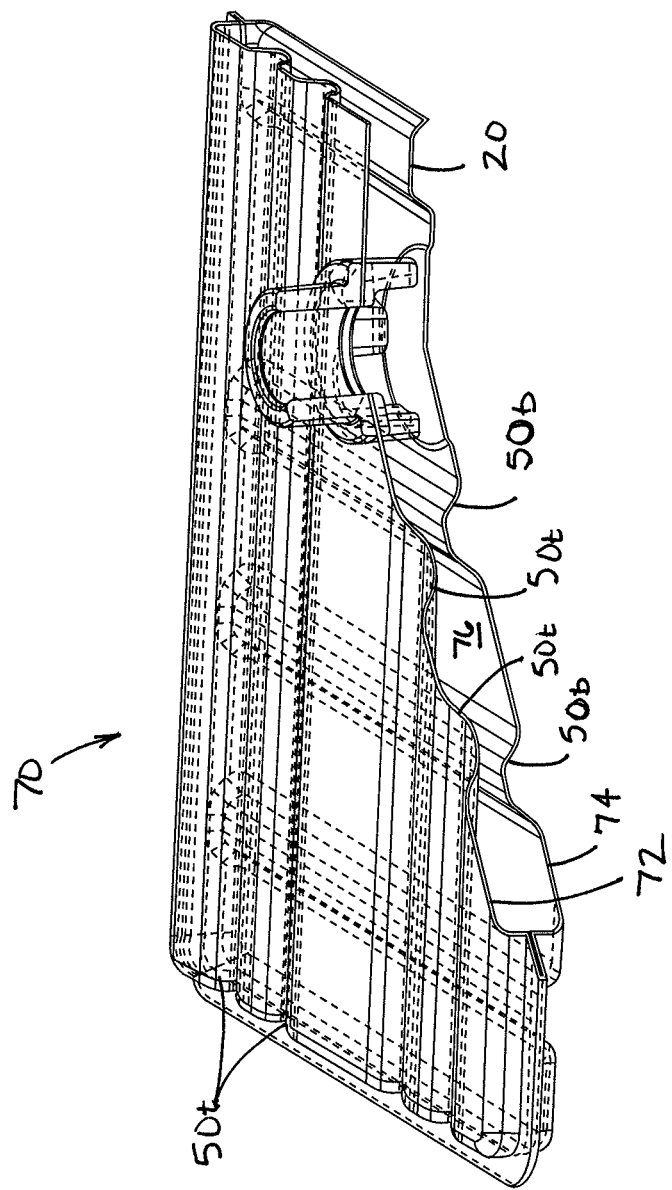
FIG. 9 is a top side cut away view of the filter in FIG. 6 and FIG. 7 in accordance with the disclosure.

Referring to FIG. 7, an implementation of a filter 70 is shown having long strips of embossed areas 50*t* running the length of the upper wall 72 of the filter 70. That is, the embossed areas 50*t* have a channel shape and extend laterally relative to a vertical axis (or longitudinally relative to the filter 70). FIG. 8 shows the bottom wall 74 of the filter 70 with embossed strips 50*b* running in the opposite direction (i.e. at an angle relative to the direction of the upper embossed strips 50*t*, e.g. 90 degrees) to provide rigid formations that press against each other. FIG. 9 is a cut away of the filter 70 of FIG. 7 and FIG. 8, and shows how the embossed areas 50t, 50b provide a separation space 76 between the top and bottom portions 72, 74 of the filter.

Figure 10:
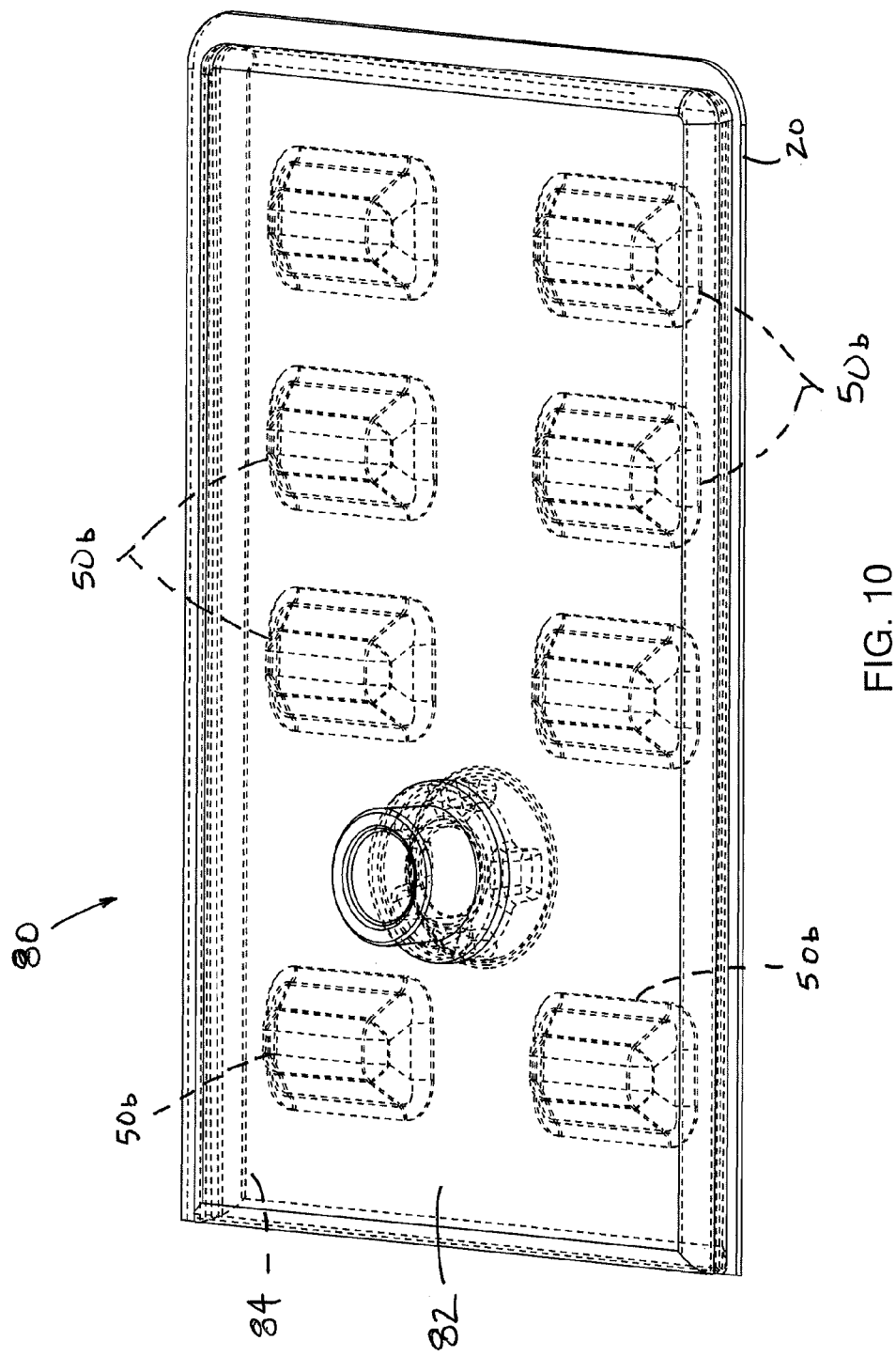
FIG. 10 is a top side detailed pictorial view of a preferred embodiment of a filter with areas of oblong embossing formations only on one side of the filtration media in accordance with the disclosure.
Figure 11:
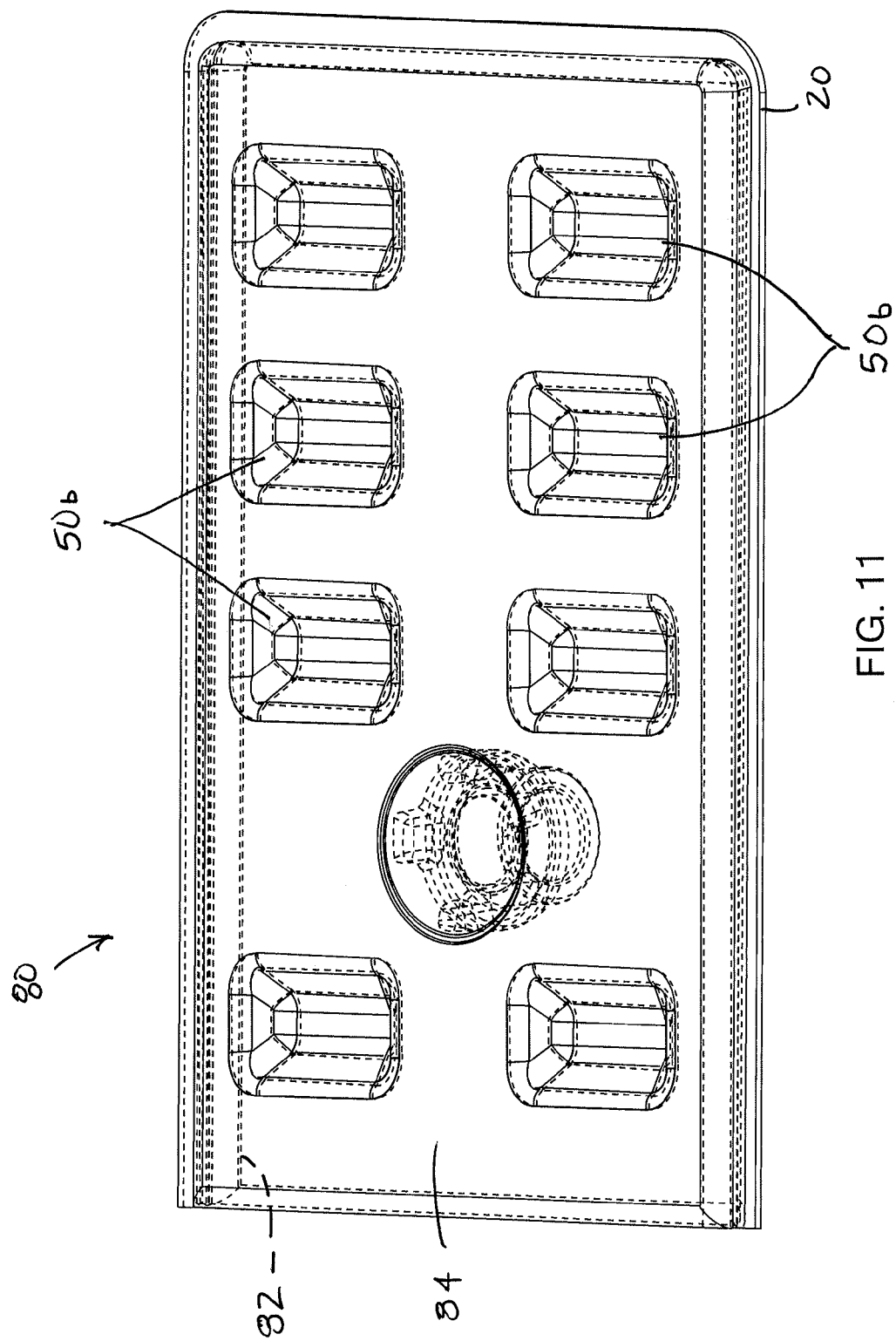
FIG. 11 is a bottom side detailed pictorial view of FIG. 9 and the preferred embodiment of a filter with areas of oblong embossing formations in the filtration media in accordance with the disclosure.
Figure 12:
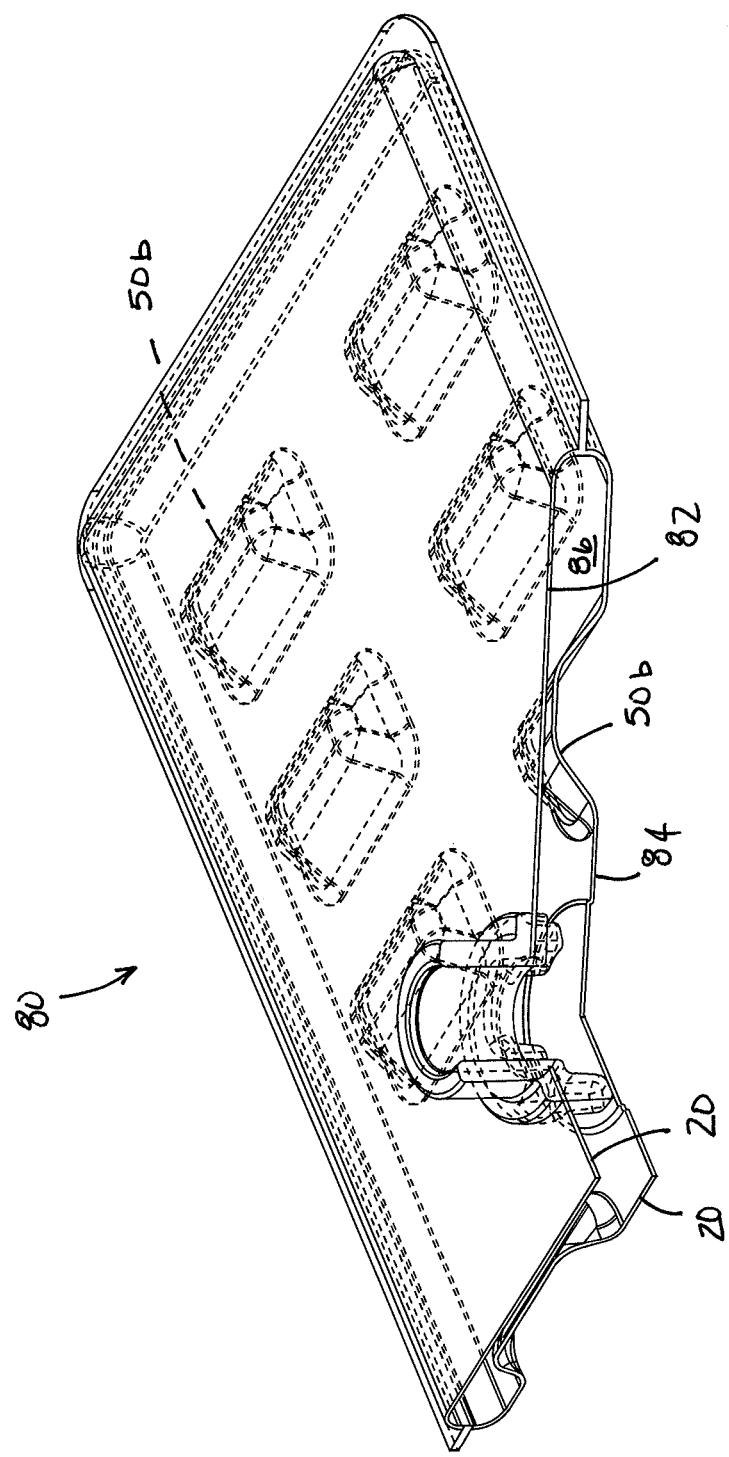
FIG. 12 is a top side cut away of the filter in FIGS. 9 and 10 in accordance with the disclosure.

Referring to FIG. 10, an implementation of a filter 80 is shown having shorter strips of embossed areas 50b on a lower wall 84 of the filter. Stated another way, the embossed areas 50b each are essentially a rectangular dot. FIG. 11 shows the top wall 82 of the filter 80, which does not have any embossed areas. FIG. 12 is a cut away of the filter 80 of FIG. 10 and FIG. 11, and shows how the embossed areas 50b provide a separation space 86 between the top and bottom portions 82, 84 of the filter 80.

Figure 13:
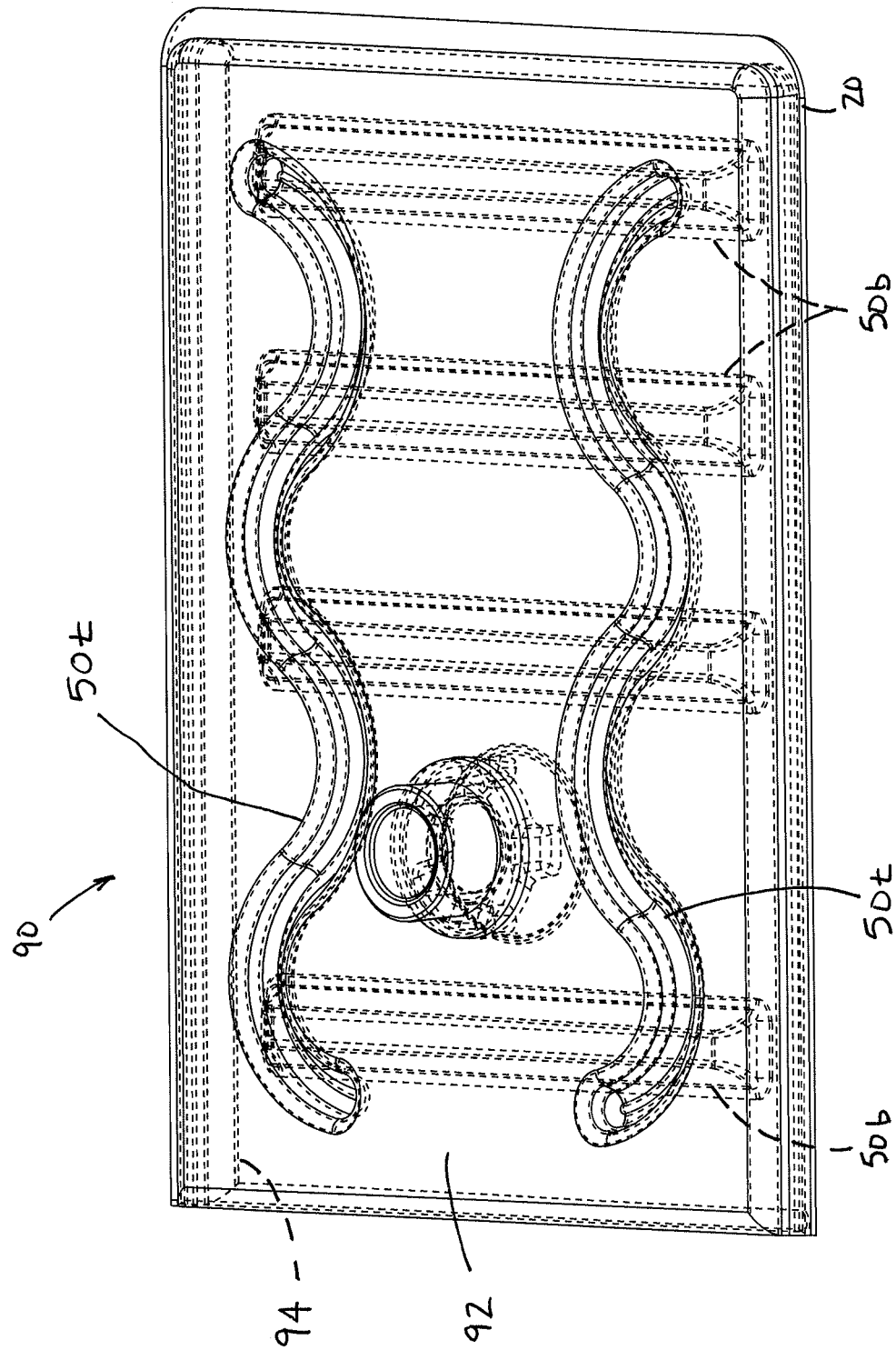
FIG. 13 is a top side detailed pictorial view of an alternate embodiment of a filter with areas of long curving embossing formations on side and long straight embossing formations on the opposite side of the filtration media in accordance with the disclosure.
Figure 14:
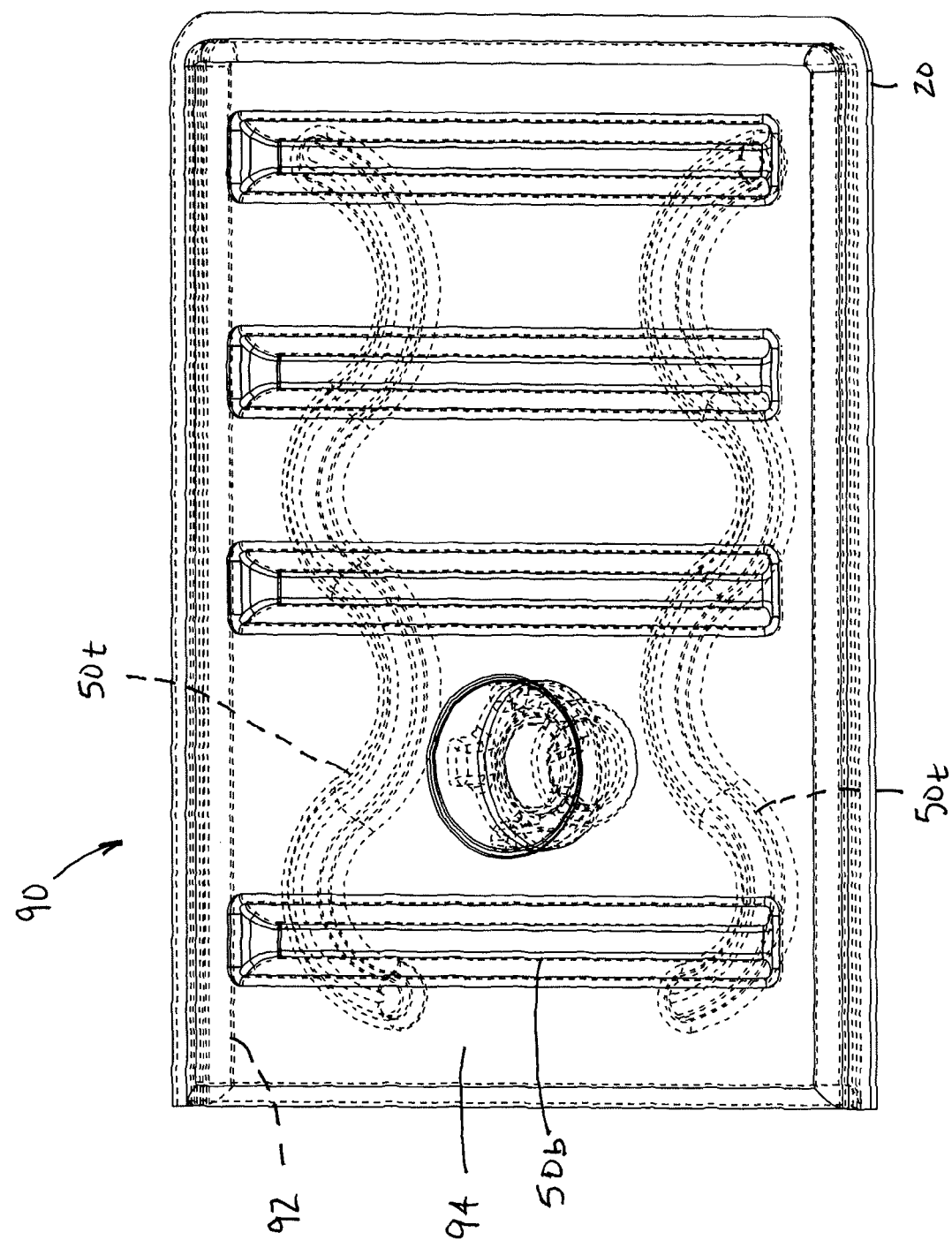
FIG. 14 is a bottom side detailed pictorial view of FIG. 12 in accordance with the disclosure.
Figure 15:
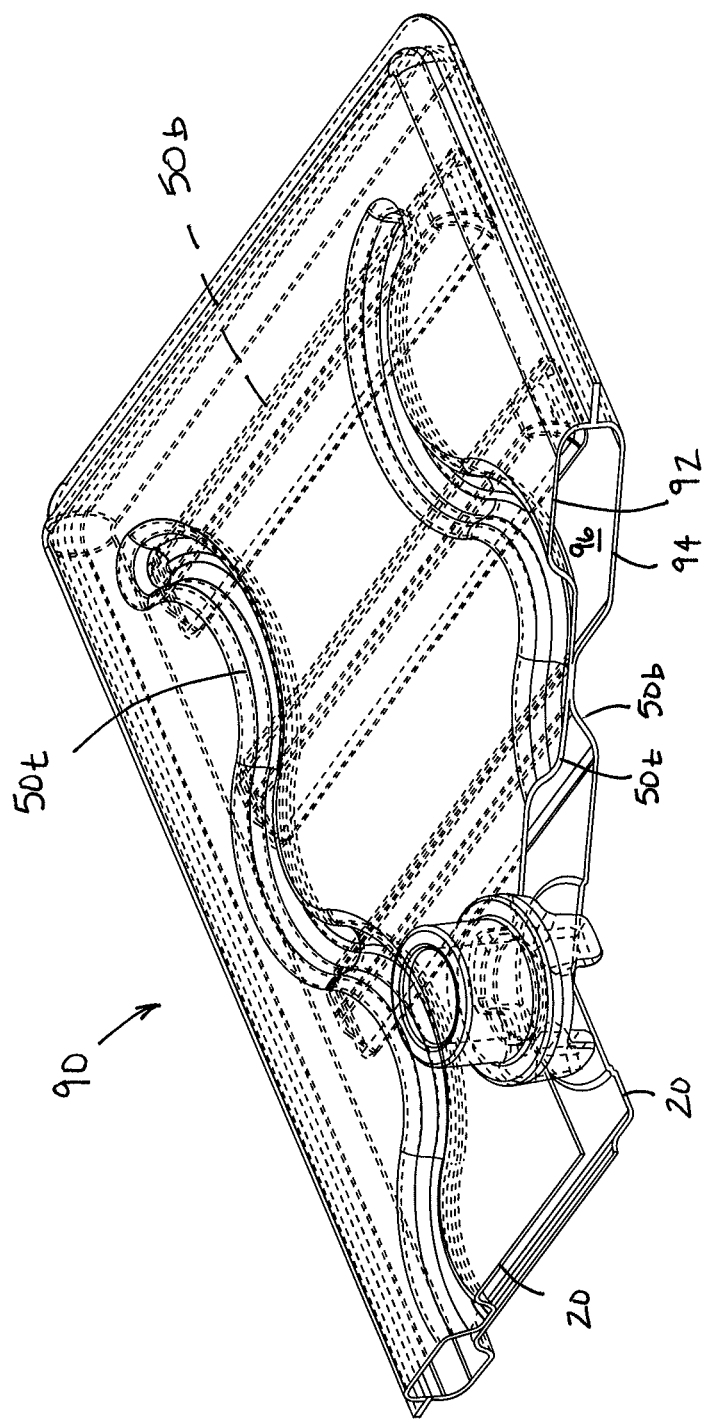
FIG. 15 is a top side cut away view of the filter in FIGS. 12 and 13 in accordance with the disclosure.

Referring to FIG. 13, an implementation of a filter 90 is shown having curving strips of embossed areas 50t on an upper wall 92 of the filter. The curvature generally follows a sinusoidal pattern, although other curvatures can be used. FIG. 14 shows the bottom wall 94 of the filter 90 with the long, straight embossed areas 50b to provide rigid formations that set against to upper embossed areas 50t. FIG. 15 is a cut away of the filter 90 of FIG. 13 and FIG. 14 and shows how the embossed areas 50t, 50b provide a separation space 96 between the top and bottom portions 92, 94 of the filter 90. That is, where the upper embossed areas 50t align with the lower embossed areas 50b, the embossed areas can press against each other to further maintain the interior space 96.

Figure 16:
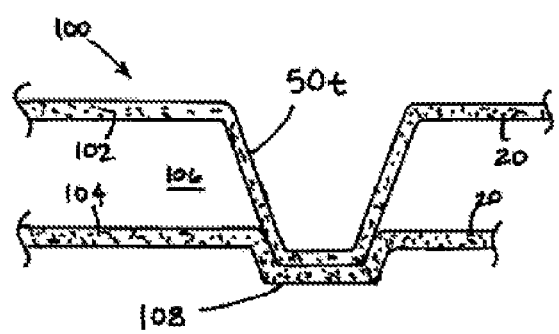
FIG. 16 is a schematic cross-sectional view of an alternate embodiment of a filter.

Referring to FIG. 16, an implementation of a filter 100 is shown having embossed areas 50t in the upper wall 102 of the filter 100 that have a depth greater than the height of the interior space 106. That is, the embossed areas 50t have a depth such that they push into the lower wall 104 and deform corresponding portions of the lower wall 104 downwardly from a plane of the lower wall 104 to form protrusions 108. In this way, the protrusions 108 can act as feet to keep the remainder if the lower wall 104 off the bottom of the tank (such as in a fuel tank), thereby allowing fluid flow through all surfaces of the filter 100.

Further areas of applicability will become apparent from the description provided herein. It should be understood that the description and specific examples are intended for purposes of illustration only and are not intended to limit the scope of the present disclosure.

The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A filter for a suction system, the filter comprising:
   filtration media formed into an enclosed shape having an upper wall spaced away from a lower wall to define an interior space therebetween, the upper and lower walls defining upper and lower planes, respectively, the filtration media having an overall thickness between 0.5 mm to 3.5 mm; and
   at least one of the upper and lower walls of the filtration media including a first non-woven filtration layer, first and second non-woven carrier layers having the first filtration layer therebetween to serve as a passage portion, and a first embossing layer positioned between the first filtration layer and one of the first and second carrier layers, the first embossing layer comprising a plastic mesh having a nominal thickness greater than 500 micron, the filtration media shaped to include a plurality of embossed areas projecting inwardly into the interior space, the embossed areas projecting inwardly a distance between 2 mm and 15 mm.

2. The filter of claim 1, wherein the upper wall includes embossed areas spaced away from the upper plane.

3. The filter of claim 2, wherein the lower wall includes embossed areas spaced away from the lower plane.

4. The filter of claim 3, wherein a shape of the embossed areas in the upper wall is different from a shape of the embossed areas in the lower wall.

5. The filter of claim 1, wherein the embossed areas have a thickness less than a thickness of the remainder of the filtration media.

6. The filter of claim 1, wherein only one of the upper and lower walls includes embossed areas.

7. The filter of claim 1, wherein the embossing layer has a nominal thickness greater than 1400 micron.

8. The filter of claim 1, wherein the embossing layer has a nominal thickness greater than 1650 micron.

9. The filter of claim 1, further comprising a plurality of embossing layers having a combined nominal thickness greater than 1200 micron.

10. The filter of claim 1, wherein the embossed areas have a frusto-conical cross-sectional shape.

11. The filter of claim 1, wherein the embossed areas are shaped as dots.

12. The filter of claim 1, wherein the embossed areas are shaped as elongated channels extending over a majority of a length or width of the filter.

13. The filter of claim 12, wherein the channels in the upper wall extend longitudinally in a first direction that is non-parallel to a second direction in which the channels in the lower wall extend.

14. The filter of claim 1, wherein the upper and lower walls each include embossed areas, and wherein the embossed areas of the upper wall are radially aligned with and extend towards the embossed areas of the lower wall relative to a vertical axis passing through the upper and lower walls, and structured such that portions of the embossed areas in the upper wall press against portions of the embossed areas of the lower wall when suction is applied to the filter.

15. The filter of claim 1, wherein the embossed areas in the upper wall are not radially aligned with the embossed areas in the lower wall.

16. The filter of claim 1, wherein each wall has an area, and wherein about 15% of the area is formed as an embossed area.

17. The filter of claim 1, wherein the ratio of the embossing depth to media thickness is 100% to 2000%.

18. The filter of claim 1, wherein the ratio of the embossing depth to media thickness is greater than 300%.

19. The filter of claim 1, wherein the embossed areas permit fluid flow therethrough.

20. The filter of claim 1, further comprising a second non-woven filtration layer positioned between the first and second carrier layers, and wherein the first embossing layer is positioned between the first and second filtration layers.

21. The filter of claim 1, further comprising a second embossing layer positioned on the exterior of one of the first and second carrier layers, the second embossing layer comprising a plastic mesh having a nominal thickness greater than 500 micron.

* * * * *